United States Patent
Horng (12)

(10) Patent No.: US 6,382,606 B1
(45) Date of Patent: May 7, 2002

(54) APPARATUS FOR POSITIONING AND CUSHIONING A ROTOR OF A FAN MOTOR

(75) Inventor: Alex Horng, Kaohsung (TW)

(73) Assignee: Sunonwealth Electric Machine Industry Co., Ltd., Kaohsiung (TW)

( * ) Notice: Subject to any disclaimer, the term of this patent is extended or adjusted under 35 U.S.C. 154(b) by 0 days.

(21) Appl. No.: 09/271,033

(22) Filed: Mar. 17, 1999

(30) Foreign Application Priority Data

Aug. 25, 1998 (TW) .......................................... 87213941

(51) Int. Cl.⁷ .................................................. F16F 1/34
(52) U.S. Cl. ...................................................... 267/161
(58) Field of Search ................................ 267/160, 161, 267/158, 162–164; 384/905.1, 581, 582, 125, 192, 202, 215; 310/9

(56) References Cited

U.S. PATENT DOCUMENTS 1,176,632 A * 3/1916 Werner ........................ 310/232
4,657,124 A * 4/1987 Flotow ...................... 192/13 R \* cited by examiner Primary Examiner—Christopher P. Schwartz
Assistant Examiner—C. T. Bartz
(74) Attorney, Agent, or Firm—Bacon & Thomas

(57) ABSTRACT

An apparatus for positioning and cushioning the shaft of a fan motor. The apparatus is mounted within a shaft tube of the motor, which also receives the rotor shaft. The apparatus generally comprises a central portion, a peripheral portion and a connecting portion. When the apparatus mounted within the shaft tube of the motor, the outer edge of the peripheral portion fits tightly against the inner wall of the shaft. The connecting portion connects the central portion to the peripheral portion, and includes a plurality of connecting pieces projecting radially outward from the central portion to the peripheral portion, thereby providing elastic effects to the apparatus for cushioning the rotor shaft, which is loaded on the central portion. In an alternate embodiment, the apparatus further comprises a plurality of hooks that are adapted to engage an annular groove on the rotor shaft, thereby locking the shaft in place within the shaft tube.

51 Claims, 12 Drawing Sheets

APPARATUS FOR POSITIONING AND CUSHIONING A ROTOR OF A FAN MOTOR

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

1. Field of the Invention

This invention pertains generally to fans, and more particularly to an apparatus for positioning and cushioning a rotor of a fan motor.

2. Description of the Background Art

Conventional fan designs typically employ a rotor shaft connecting the fan to the motor. The rotor shaft generally passes through a first bearing, a copper ring or the like, a spring and a second bearing. The first bearing, copper ring, spring and second bearing are positioned within a tube of the motor. There is an annular groove adjacent the distal end of the rotor shaft in which a C-shape ring is mounted to retain the fan in place on the motor. The spring provides resilient and cushioning effects and helps maintain axial positioning of the fan relative to the motor.

During assembly of the fan, the springs tends to tangle with each other, and due to their elasticity, it is difficult to assemble the fans onto the motors. Additionally, it is difficult to mount the C-shape ring into the annular groove of the rotor shaft.

Accordingly, there exists a need for an apparatus for positioning and cushioning the rotor shaft of a fan without the inherent difficulties encountered with handling and assembling conventional springs on the rotor shaft. There also exist a need for an apparatus that retains the fan in place on the motor that eliminates the difficulties encountered in mounting the C-shaped ring into the annular groove of the rotor shaft. The present invention satisfies these needs, as well as others, and generally overcomes the deficiencies found in the background art.

BRIEF SUMMARY OF THE INVENTION

The present invention relates to an apparatus for positioning and cushioning the rotor of a fan motor. The device is mounted within a shaft tube of a motor, which receives the rotor shaft of the motor. The device generally comprises a central portion, a peripheral portion and a connecting portion. The central portion is adapted to contact one end of the rotor shaft. When the device is inserted into the shaft tube, the outer edge of the peripheral portion fits tightly within the shaft tube. The connecting portion suspends the central portion within the peripheral portion and comprises a plurality of connecting pieces projecting outwards from the central portion to the peripheral portion, thereby providing an elastic effect to the central portion when loaded thereon.

An object of the invention is to provide an apparatus for positioning and cushioning the rotor of a fan motor.

Another object of the invention is to provide an apparatus for positioning and cushioning the rotor of a fan motor that eliminates the need for a spring.

Another object of the invention is to provide an apparatus for positioning and cushioning the rotor of a fan motor that eliminates the inherent difficulties encountered in assembling a fan.

Further objects and advantages of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings which are for illustrative purposes only.

DETAILED DESCRIPTION OF THE INVENTION

Figure 1:
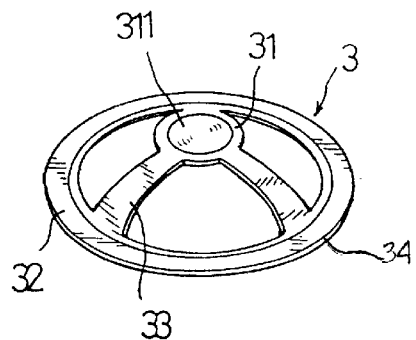
FIG. 1 is a perspective view of a preferred embodiment of an apparatus for positioning and cushioning a rotor of a fan motor in accordance with the present invention.

Referring more specifically to the drawings, for illustrative purposes the present invention is embodied in the apparatus generally shown in FIG. 1 through FIG. 42. It will be appreciated that the apparatus may vary as to configuration and as to details of the parts without departing from the basic concepts as disclosed herein.

Referring to FIG. 1 through FIG. 5, a preferred embodiment of apparatus 3, in accordance with the present invention is generally shown. Apparatus 3 is provides for positioning and cushioning the rotor shaft 16 of a motor 26. Apparatus 3 generally comprises a central portion 31, a peripheral portion 32 and a connecting portion 33. Connecting portion 33 attaches or connects central portion 31 to peripheral portion 32. Connecting portion 33 includes a plurality of connecting pieces projecting radially from central portion 31 to peripheral portion 32.

Connecting portion 33 extends upwardly from peripheral portion 32 towards central portion 31, such that central portion 31 is disposed on a plane above peripheral portion 32, as shown in FIG. 1 through FIG. 4. Alternatively, connecting portion 33 may extend downwardly from peripheral portion 32 towards central portion 31 such that central portion 31 is disposed on a plane below peripheral portion 32. Moreover, connecting portion 33 may extend horizontally from peripheral portion 32 towards central portion 31 thereby sharing a common plane.

Figure 2:
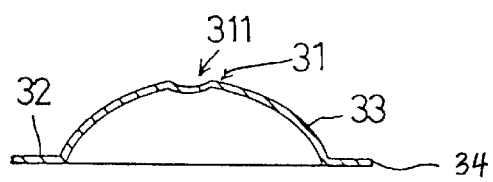
FIG. 2 is a cross-sectional view of the device shown in FIG. 1.
Figure 3:
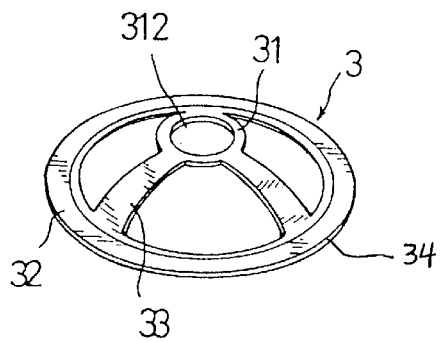
FIG. 3 is a perspective view of the device shown in FIG. 1 in which the central portion incorporates a hole therethrough.
Figure 4:
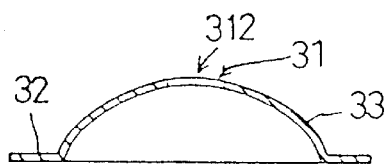
FIG. 4 is a cross-sectional view of the device shown in FIG. 3.

As can be seen in FIG. 1 and FIG. 2, center portion 31 includes a recess 311 adapted for receiving end 161 of rotor shaft 16. Alternatively, as can be seen in FIG. 3 and FIG. 4, central portion 31 can include a bore or hole 312 for receiving end 161 of rotor shaft 16. Moreover, central portion 31 can also be relatively flat for contacting end 161 of rotor shaft 16.

Figure 5:
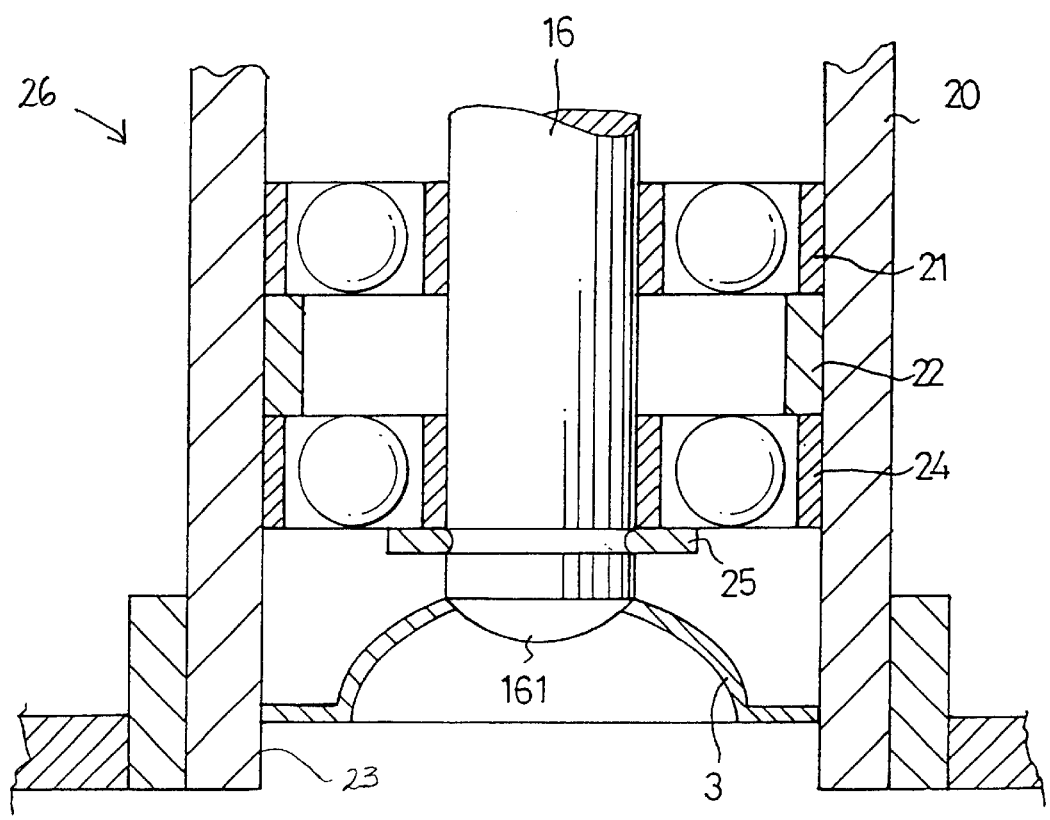
FIG. 5 is a cross-sectional view of the device shown in FIG. 3 inserted within a shaft tube of a motor along with a rotor shaft inserted therein.

FIG. 5 is a cross section view showing apparatus 3 mounted within shaft tube 20 of motor 26, whereby the outer edge 34 of peripheral portion 32 is flush against the inner wall 23 of shaft tube 20 and fits tightly therein. Central portion 31 is designed to contact an end 161 of rotor shaft 16. Connecting portion 33 is somewhat elastic such that when apparatus 3 is mounted within shaft tube 20 and rotor shaft is resting on central portion 31, rotor shaft 16 is capable of longitudinal movement thereon. Connecting portion 33, therefore, allows for a cushioning effect on rotor shaft 16.

Referring also to FIG. 6 through FIG. 9, a second embodiment of apparatus 4, in accordance with the present invention is generally shown. Apparatus 4 generally comprises a central portion 41, a peripheral portion 42 and a connecting portion 43. Peripheral portion 42 further comprises a plurality of teeth 44 projection radially outward from its outer edge 45 to abut tightly against inner wall 23 of shaft tube 20 when apparatus 4 is mounted therein.

Connecting portion 43 extends upwardly from peripheral portion 42 towards central portion 41 such that central portion 41 is disposed on a plane above peripheral portion 42, as shown in FIG. 6 through FIG. 9. Alternatively, connecting portion 43 may extend downwardly from peripheral portion 43 such that central portion 41 is on a plane below peripheral portion 42. Moreover, connecting portion 43 may extend horizontally from peripheral portion 42 towards central portion 41 thereby sharing a common plane.

Figure 6:
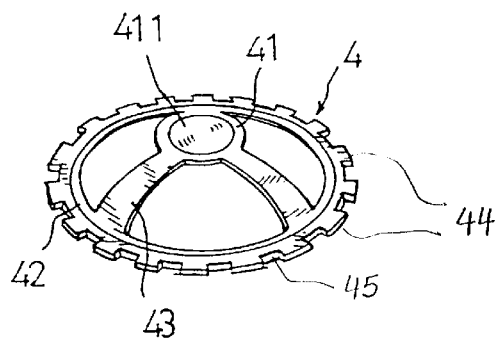
FIG. 6 is a perspective view of a second embodiment of an apparatus for positioning and cushioning a rotor of a fan motor in accordance with the present invention.
Figure 7:
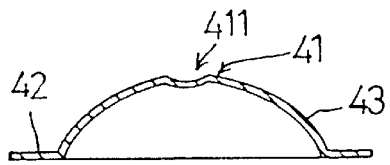
FIG. 7 is a cross-sectional view of the device shown in FIG. 6.
Figure 8:
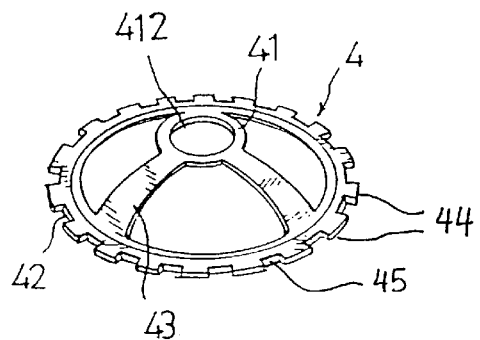
FIG. 8 is a perspective view of the device shown in FIG. 6 in which the central portion incorporates a hole therethrough.
Figure 9:
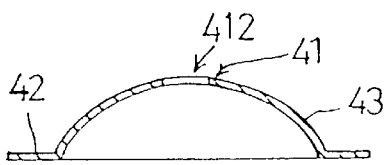
FIG. 9 is a cross-sectional view of the device shown in FIG. 8.

As can be seen in FIG. 6 and FIG. 7, central portion 41 includes a recess 411 adapted for receiving end 161 of rotor shaft 16. Alternatively, central portion 41 can include a bore or hole 412, as shown in FIG. 8 and FIG. 9, for receiving end 161 of rotor shaft 16. Moreover, central portion 41 can also be relatively flat for contacting end 161 of rotor shaft 16.

Referring also to FIG. 10 through FIG. 13, a third embodiment of apparatus 5, in accordance with the present invention is generally shown. Third embodiment of apparatus 5 generally comprises a central portion 51, a peripheral portion 52 and a connecting portion 53. The peripheral portion 52 includes a cylindrical wall 522 extending upwardly from the outer edge 54 of peripheral portion 52. Peripheral wall 522 is adapted tightly fit within shaft tube 20 and provides a larger contact area with inner wall 23 of shaft tube 20, thereby providing more friction between both surfaces.

Connecting portion 53 extends upwardly from peripheral portion 52 towards central portion 51 such that central portion 51 is disposed on a plane above peripheral portion 52, as shown in FIG. 10 through FIG. 13. Alternatively, connecting portion 53 may also extend downwardly from peripheral portion 52 towards central portion 51 such that central portion 51 is disposed on a plane below peripheral portion 52. Moreover, connecting portion 53 may extend horizontally from peripheral portion 52 towards central portion 51, thereby sharing a common plane.

Figure 10:
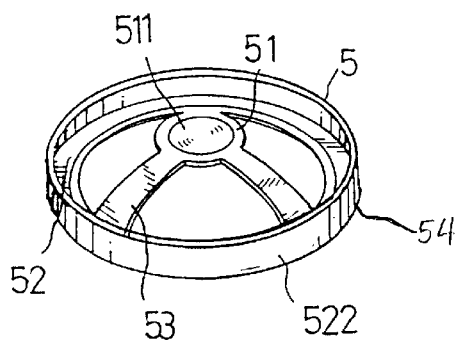
FIG. 10 is a perspective view of a third embodiment of an apparatus for positioning and cushioning a rotor of a fan motor in accordance with the present invention.
Figure 11:
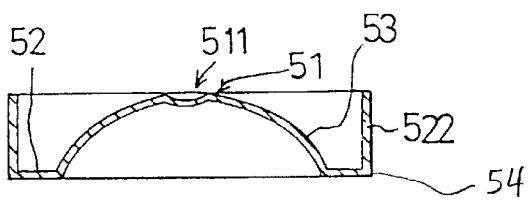
FIG. 11 is a cross-sectional view of the device shown in FIG. 10.
Figure 12:
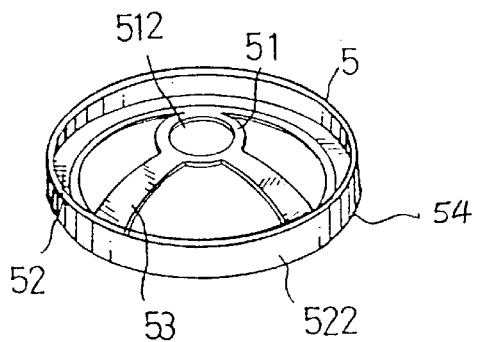
FIG. 12 is a perspective view of the device shown in FIG. 10 in which the central portion incorporates a hole therethrough.
Figure 13:
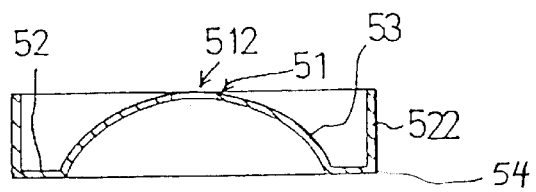
FIG. 13 is a cross-sectional view of the device shown in FIG. 12.

As can be seen in FIG. 10 and FIG. 11, central portion 51 includes a recess 511 for receiving end 161 of rotor shaft 16. Alternatively, central portion 51 can include a hole 512, as shown in FIG. 12 and FIG. 13, for receiving end 161 of rotor shaft 16. Moreover, central portion 51 may also be relatively flat for contacting end 161 of rotor shaft 16.

Referring also to FIG. 14 through FIG. 17, a fourth embodiment of apparatus 6, in accordance with the present invention is generally shown. Apparatus 6 generally comprises a central portion 61, a peripheral portion 62 and a connecting portion 63. Peripheral portion 62 further comprises a plurality tabs 621, 622 and 623 extending upwardly from the outer edge 64 of peripheral portion 62.

Connecting portion 63 extends upwardly from peripheral portion 62 towards central portion 61 such that central portion 61 is disposed on a plane above peripheral portion 62, as shown in FIG. 14 through FIG. 17. Alternatively, connecting portion 63 may also extend downwardly from peripheral portion 62 towards central portion 61 such that central portion 61 is disposed on a plane below peripheral portion 62. Moreover, connecting portion 63 may also extend horizontally from peripheral portion 62 towards central portion 61, thereby sharing a common plane.

Figure 14:
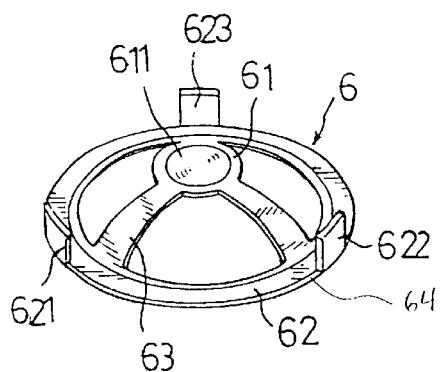
FIG. 14 is a perspective view of a fourth embodiment of an apparatus for positioning and cushioning a rotor of a fan motor in accordance with the present invention.
Figure 15:
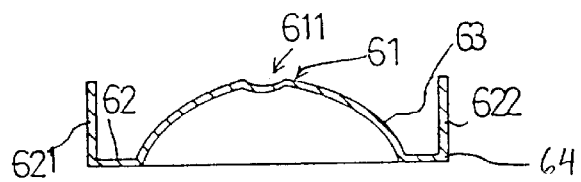
FIG. 15 is a cross-sectional view of the device shown in FIG. 14.
Figure 16:
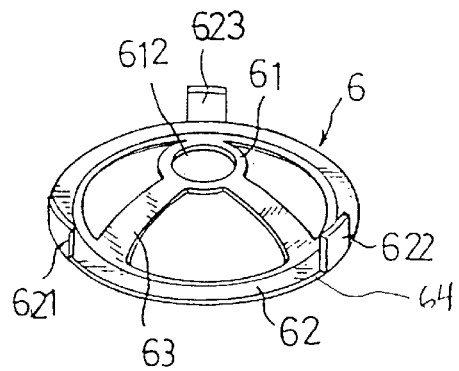
FIG. 16 is a perspective view of the device shown in FIG. 14 in which the central portion incorporates a hole therethrough.
Figure 17:
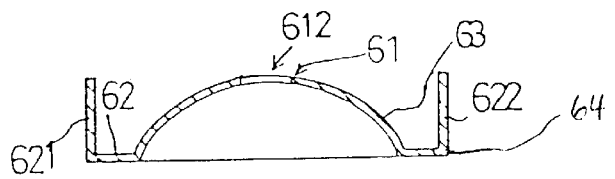
FIG. 17 is a cross-sectional view of the device shown in FIG. 16.

As can be seen in FIG. 14 and FIG. 15, central portion 61 includes a recess 611 for receiving end 161 of rotor shaft 16. Alternatively, central portion 61 can include a hole 612, as shown in FIG. 16 and FIG. 17, for receiving end 161 of rotor shaft 16. Moreover, central portion 61 may also be relatively flat for contacting end 161 of rotor shaft 16.

Figure 20:
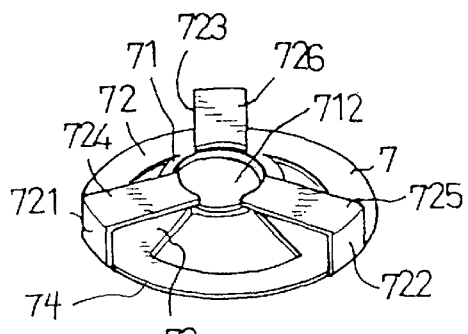
FIG. 20 is a perspective view of the device shown in FIG. 18 in which the central portion incorporates a hole therethrough.
Figure 21:
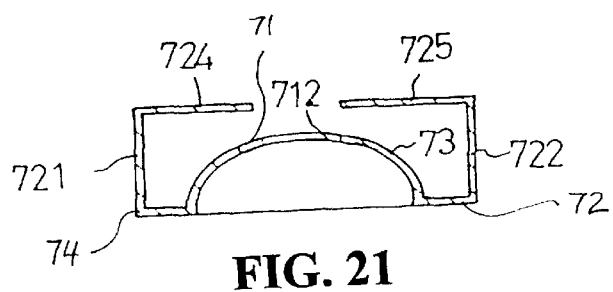
FIG. 21 is a cross-sectional view of the device shown in FIG. 20.
Figure 22:
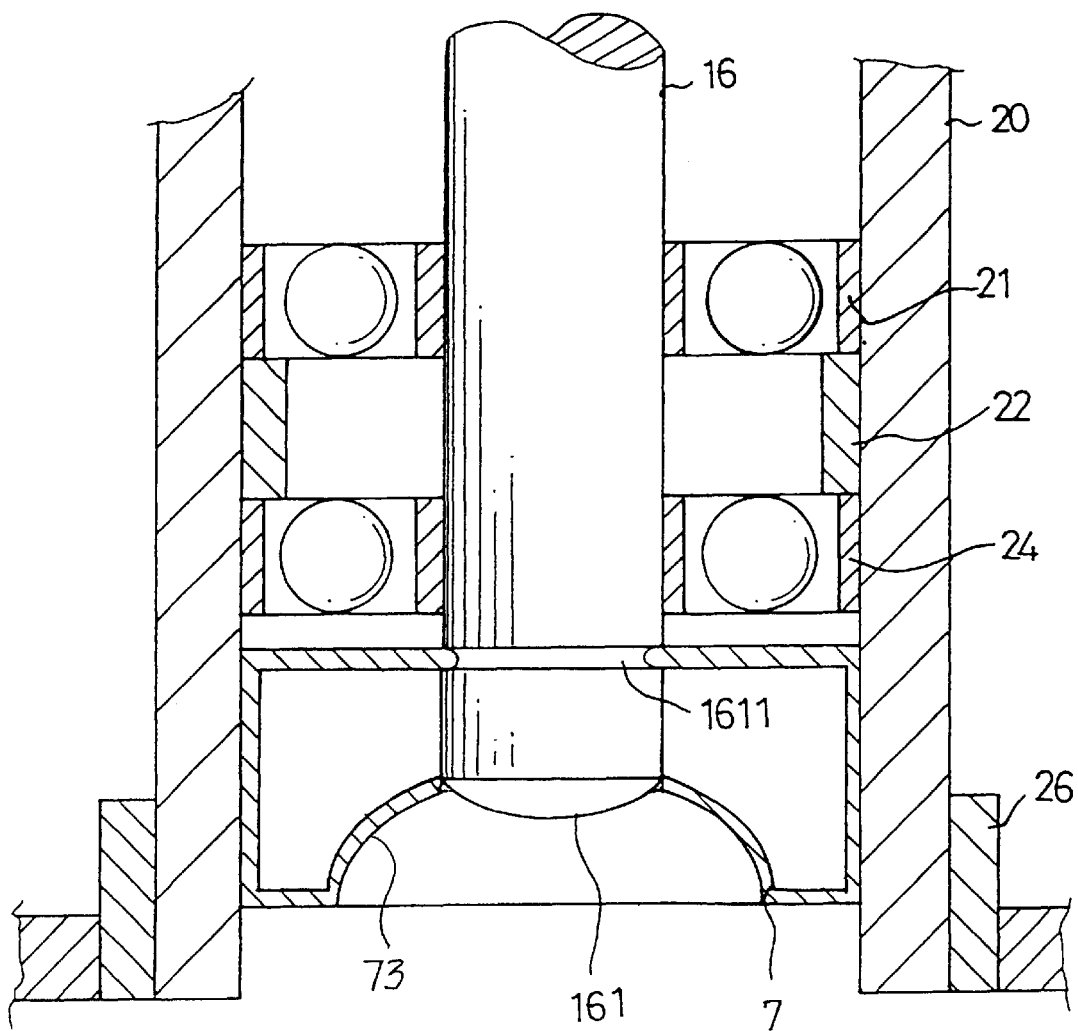
FIG. 22 is a cross-sectional view of the device shown in FIG. 20 inserted within a shaft tube of a motor along with a rotor shaft inserted therein.

Referring also to FIG. 18 through FIG. 22, a fifth embodiment of apparatus 7 in accordance with the present invention is generally shown. Apparatus 7 generally comprises a central portion 71, a peripheral portion 72 and a connecting portion 73. Apparatus 7 further comprises a plurality of posts 721, 722, 723 extending upwardly from the outer edge 74 of peripheral portion 72 and a plurality of hooks 724, 725, 726 extending radially inwards from posts from the top of posts 721, 722, 723, respectively. Hooks 724, 725, 726 are adapted to engage an annular groove 1611 of rotor shaft 16 when apparatus 7 is mounted within shaft tube 20 and rotor shaft 16 is inserted therein, thereby locking rotor shaft 16 in place relative to central portion 71, as shown in FIG. 22. The combination of posts 721, 722, 723 and hooks 724, 725, 726 on apparatus 7, effective replace a C-shape ring (not shown) normally used in a conventional rotor structure (not shown).

Connecting portion 73 extends upwardly from peripheral portion 72 towards central portion 71, such that central portion 71 is disposed on a plane above peripheral portion 72 but below hooks 724, 725, 726, as shown in FIG. 18 through FIG. 22. Alternatively, connecting portion 73 may extend downwardly from peripheral portion 72 towards central portion 71 such that central portion 71 is disposed on a plane below peripheral portion 72. Moreover, connecting portion 73 may extend horizontally from peripheral portion 72 towards central portion 71, thereby sharing a common plane.

Figure 18:
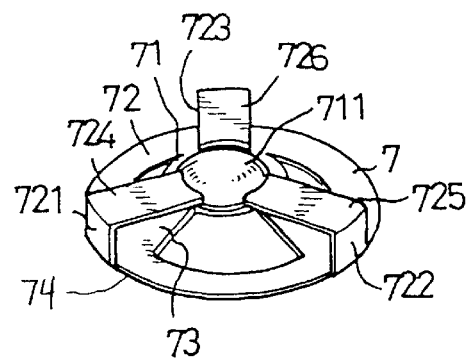
FIG. 18 is a perspective view of a fifth embodiment of an apparatus for positioning and cushioning a rotor of a fan motor in accordance with the present invention.
Figure 19:
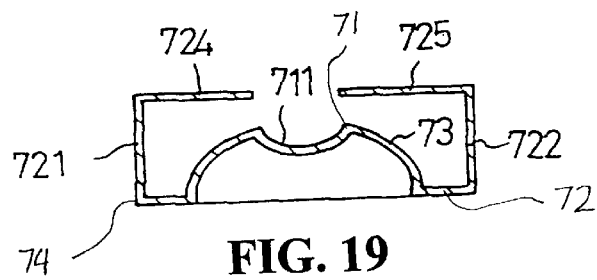
FIG. 19 is a cross-sectional view of the device shown in FIG. 18.

As can be seen in FIG. 18 and FIG. 19, central portion 71 includes a recess 711 for receiving end 161 of rotor shaft 16. Alternatively, central portion 71 can include a hole 712, as shown in FIG. 20 and FIG. 21, for receiving end 161 of rotor shaft 16. Moreover, central portion 71 may also be relatively flat for contacting end 161 of rotor shaft 16.

Referring also to FIG. 23 through FIG. 26, a sixth embodiment of apparatus 8 in accordance with the present invention is generally shown. Apparatus 8 generally comprises a central portion 81, a peripheral portion 82 and a connecting portion 83. The peripheral portion 82 further comprises a plurality of legs 821 and 822 extending downwardly from the outer edge 84 of peripheral portion 82 and a generally circular base 824 attached to legs 821, 822. Base 824 is adapted to fit tightly within shaft tube 20 and to provide a larger contact area with inner wall 23 of shaft tube 20, thereby increasing the frictional contact area between both surfaces.

Connecting portion 83 extends upwardly from peripheral portion 82 towards central portion 81 such that central portion 81 is disposed on a plane above peripheral portion 82, as shown in FIG. 23 through FIG. 26. Alternatively, connecting portion 83 may extend downwardly from peripheral portion 82 towards central portion 81 such that central portion 81 is disposed on a plane below peripheral portion 82. Moreover, connecting portion 83 may extend horizontally from peripheral portion 82 towards central portion 81, thereby sharing a common plane.

Figure 23:
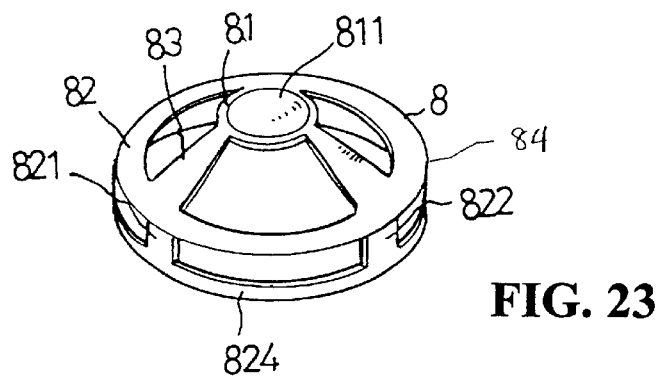
FIG. 23 is a perspective view of a sixth embodiment of an apparatus for positioning and cushioning a rotor of a fan motor in accordance with the present invention.
Figure 24:
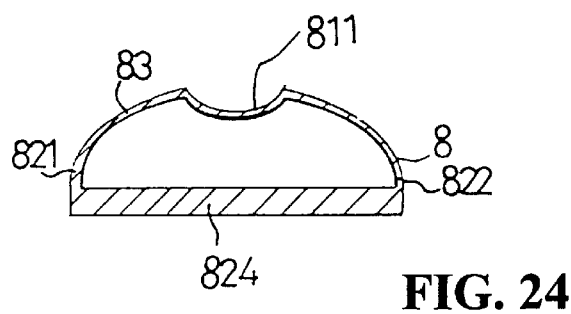
FIG. 24 is a cross-sectional view of the device shown in FIG. 23.
Figure 25:
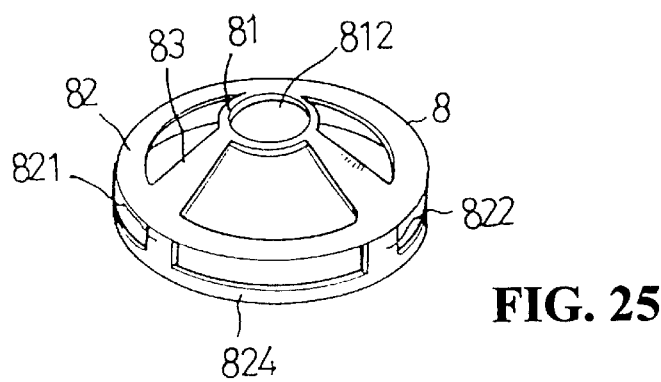
FIG. 25 is a perspective view of the device shown in FIG. 23 in which the central portion incorporates a hole therethrough.
Figure 26:
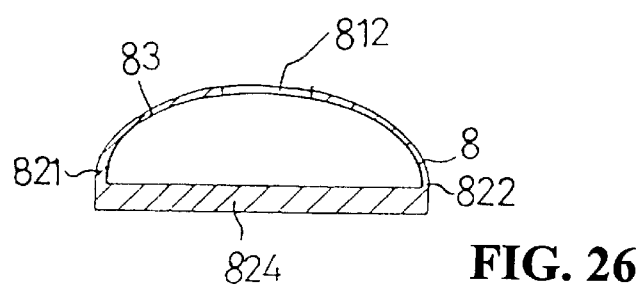
FIG. 26 is a cross-sectional view of the device shown in FIG. 25.

As can be seen in FIG. 23 and FIG. 24, central portion 81 includes a recess 811 for receiving end 161 of rotor shaft 16. Alternatively, central portion 81 can include a hole 812, as shown in FIG. 25 and FIG. 26, for receiving end 161 of rotor shaft 16. Moreover, central portion 81 may also be relatively flat for contacting end 161 of rotor shaft 16.

Referring also to FIG. 27 through FIG. 30, a seventh embodiment of apparatus 9 in accordance with the present invention is generally shown. Apparatus 9 generally comprises a central portion 91, a peripheral portion 92 and a connecting portion 93. Apparatus 9 further comprises a cylindrical base 921 extending below the outer edge 94 of peripheral portion 92. Cylindrical base 921 is adapted to fit tightly within shaft tube 20 and provides a larger contact area between inner wall 23 of shaft tube 20 thereby increasing the frictional contact area between both surfaces.

Connecting portion 93 projects downwardly from the peripheral portion 92 towards the central portion 91 such that central portion 91 is disposed on a plane below peripheral portion 92, as shown in FIG. 27 through 30. Alternatively, the connecting portion may extend upwardly from peripheral portion 92 towards central portion 91 such that central portion 91 is disposed on a plane above peripheral portion 92. Moreover, connecting portion 93 may extend horizontally from peripheral portion 92 towards central portion 91, thereby sharing a common plane.

Figure 27:
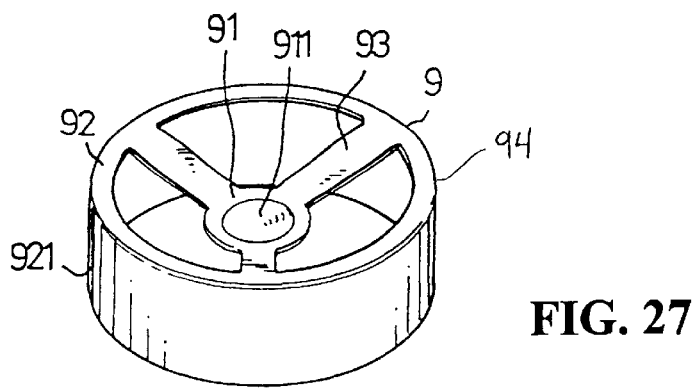
FIG. 27 is a perspective view of a seventh embodiment of an apparatus for positioning and cushioning a rotor of a fan motor in accordance with the present invention.
Figure 28:
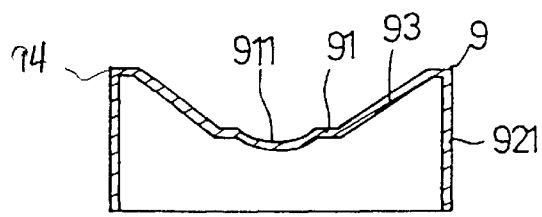
FIG. 28 is a cross-sectional view of the device shown in FIG. 27.
Figure 29:
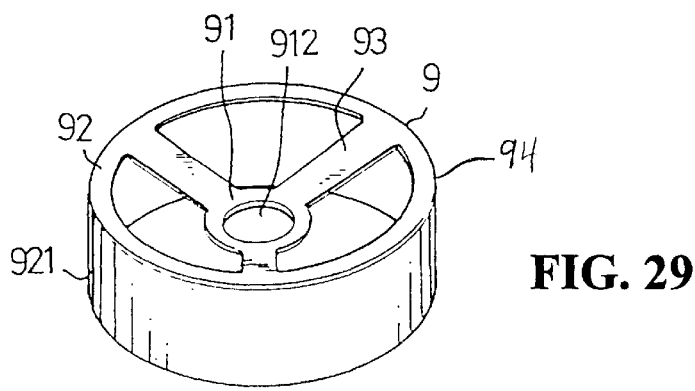
FIG. 29 is a perspective view of the device shown in FIG. 27 in which the central portion incorporates a hole therethrough.
Figure 30:
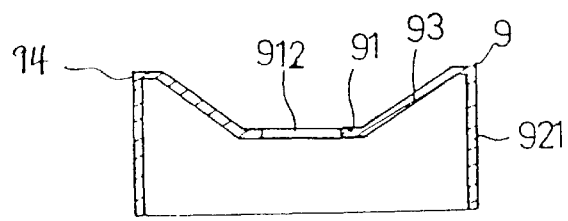
FIG. 30 is a cross-sectional view of the device shown in FIG. 29.

As can be seen in FIG. 27 and FIG. 28, central portion 91 includes a recess 911 for receiving end 161 of rotor shaft 16. Alternatively, as shown in FIG. 29 and FIG. 30, central portion 91 may include a hole 912 for receiving end 161 of rotor shaft 16. Moreover, central portion 91 may also be relatively flat for contacting end 161 of rotor shaft 16.

Referring also to FIG. 31 through FIG. 34, an eighth embodiment of an apparatus 10 in accordance with the present invention is generally shown. Apparatus 10 generally comprises a central portion 101, a peripheral portion 102 and a connecting portion 103. Apparatus 10 further comprises a plurality of supports 1021, 1022, 1023 extending upwardly from the connecting pieces to peripheral portion 102, which in this embodiment comprises a peripheral wall 1024. Peripheral wall 1024 is adapted to fit tightly within shaft tube 20 and provides a larger contact area along with supports 1021, 1022, 1023 on inner wall 23 of shaft tube 20, thereby increasing the frictional contact area between both surfaces. Since connecting portion 103 is attached directly to upwardly extending supports 1021, 1022, 1023, connecting portion 103 can provide better elasticity to rotor shaft 16 when loaded thereon.

Connecting portion 103 extends upwardly from supports 1021, 1022, 1023 towards central portion 101 such that central portion 101 is disposed on a plane above supports 1021, 1022, 1023, as shown in FIG. 31 through FIG. 34. Alternatively, connecting portion 103 may extend downwardly from supports 1021, 1022, 1023 towards central portion 101 such that central portion 101 is disposed on a plane below supports 1021, 1022, 1023. Moreover, connecting portion 103 may extend horizontally from supports 1021, 1022, 1023 towards central portion 101, thereby sharing a common plane.

Figure 31:
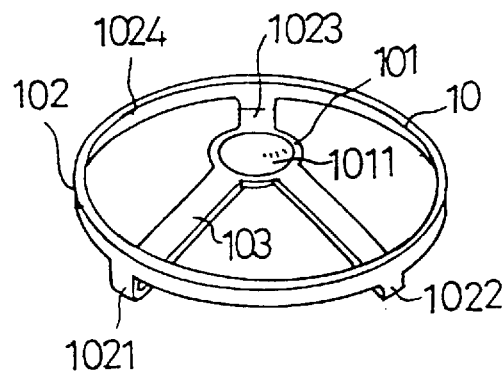
FIG. 31 is a perspective view of a eighth embodiment of an apparatus for positioning and cushioning a rotor of a fan motor in accordance with the present invention.
Figure 32:
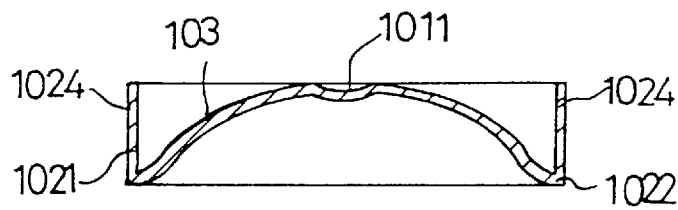
FIG. 32 is a cross-sectional view of the device shown in FIG. 31.
Figure 33:
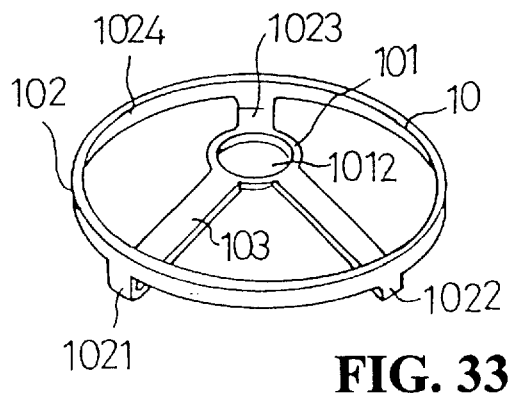
FIG. 33 is a perspective view of the device shown in FIG. 32 in which the central portion incorporates a hole therethrough.
Figure 34:
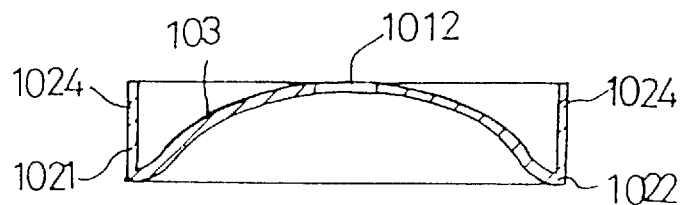
FIG. 34 is a cross-sectional view of the device shown in FIG. 33.

As shown in FIG. 31 and FIG. 32, central portion 101 includes a recess 1011 for receiving end 161 of rotor shaft 16. Alternatively, the central portion 101 may include a hole 1012, as shown in FIG. 33 and FIG. 34, for receiving end 161 of rotor shaft 16. Moreover, central portion 101 may also be relatively flat for contacting end 161 of rotor shaft 16.

Referring also to FIG. 35 through FIG. 40, a ninth embodiment of an apparatus 11, in accordance with the present invention is generally shown. Apparatus 11 generally comprises a central portion 111, a peripheral portion 112 and a connecting portion 113. Apparatus 11 further comprises a plurality of legs 1121, 1122 and 1123 extending downwardly from the connecting pieces of connecting portion 113 to peripheral portion 112, which in this embodiment comprises a base 1124. Base 1124 is adapted to fit tightly within shaft tube 20 by providing a larger contact area with inner wall 23 of shaft tube 20, thereby increasing the frictional contact area between both surfaces. Since connecting portion 113 is attached to downwardly extending legs 1121, 1122, 1123, connecting portion 113 provides better elasticity when rotor shaft 16 is loaded on central portion 111.

Figure 37:
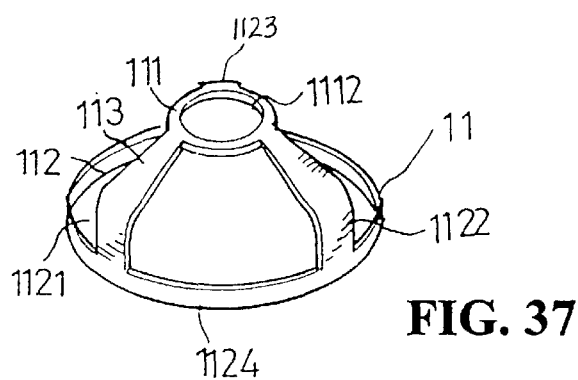
FIG. 37 is a perspective view of the device shown in FIG. 35 in which the central portion incorporates a hole therethrough.
Figure 38:
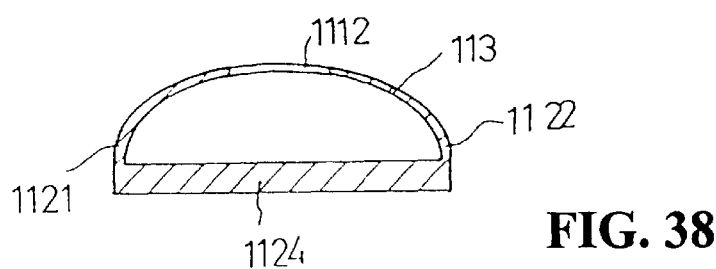
FIG. 38 is a cross-sectional view of the device shown in FIG. 37.
Figure 39:
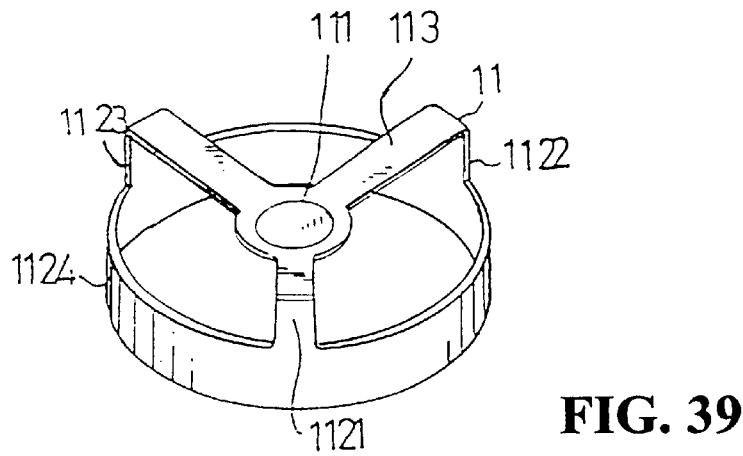
FIG. 39 is a variation of the device shown in FIG. 35.
Figure 40:
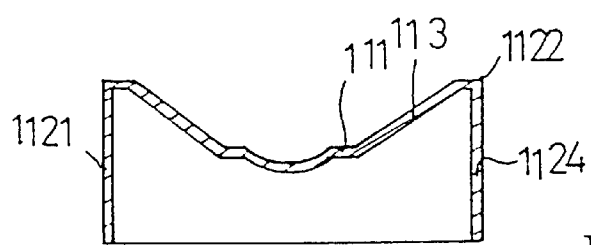
FIG. 40 is a cross-sectional view of the device shown in FIG. 39.

Connecting portion 113 extends upwardly from legs 1121, 1122, 1123 towards central portion 111 such that central portion 111 is disposed on a plane above peripheral portion 112 and legs 1121, 1122, 1123, as shown in FIG. 35 through FIG. 38. Alternatively, connecting portion 113 may extend downwardly from legs 1121, 1122, 1123 towards central portion 111 such that central portion 111 is disposed on a plane below legs 1121, 1122, 1123, as shown in FIG. 39 and FIG. 40. Moreover, connecting portion 113 may extend horizontally from legs 1121, 1122, 1123 towards central portion, thereby sharing a common plane with the tops of legs 1121, 1122, 1123.

Figure 35:
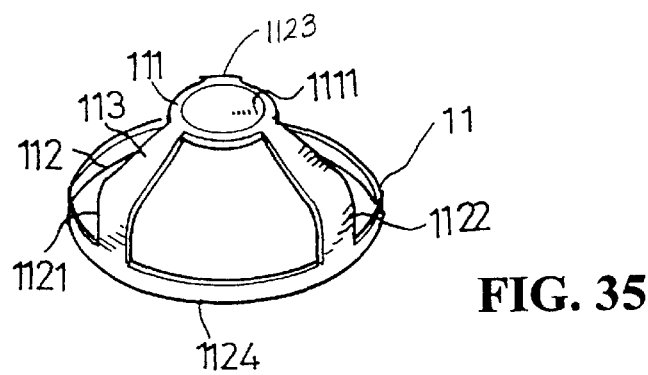
FIG. 35 is a perspective view of a ninth embodiment of an apparatus for positioning and cushioning a rotor of a fan motor in accordance with the present invention.
Figure 36:
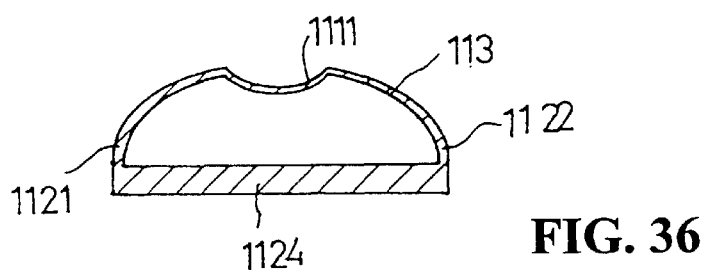
FIG. 36 is a cross-sectional view of the device shown in FIG. 35.

As can be seen in FIG. 35 and FIG. 36, central portion 111 includes a recess 1111 for receiving end 161 of the rotor shaft 16. Alternatively, central portion 111 may include a hole 1112 for receiving end 161 of rotor shaft 16, as shown in FIG. 37 and FIG. 38. Moreover, central portion 111 can also be a flat section adapted for contacting end 161 of rotor shaft 16.

Figure 41:
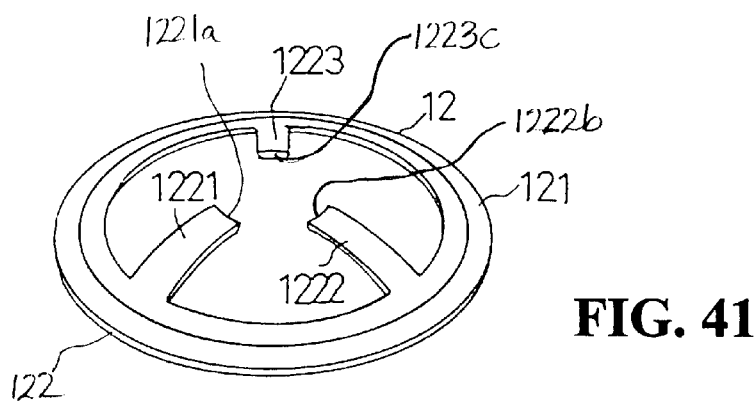
FIG. 41 is a perspective view of an eleventh embodiment of an apparatus for positioning and cushioning a rotor of a fan motor in accordance with the present invention.
Figure 42:
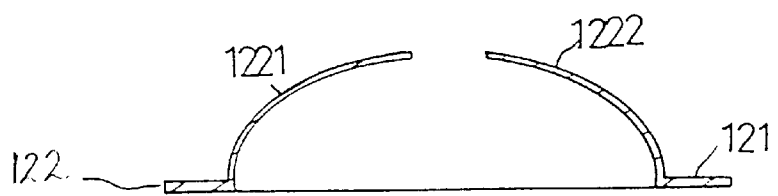
FIG. 42 is a cross-sectional view of the device shown in FIG. 41.

Referring finally to FIG. 41 and FIG. 42, a tenth embodiment of an apparatus 12, in accordance with the present invention is generally shown. Apparatus 12 generally comprises a peripheral portion 121 and a plurality of hooks 1221, 1222 and 1223 extending radially inward from peripheral portion 121. The outer edge 122 of peripheral portion 121 is adapted to fit tightly within shaft tube 20 of motor 26 when apparatus 12 is mounted therein. Hooks 1221, 1222 and 1223 are adapted for engaging annular groove 1611 of rotor shaft 16 when apparatus 12 is mounted within shaft tube 20 and rotor shaft 16 is inserted therein, thereby locking rotor shaft 16 in place relative to apparatus 12. Apparatus 12 replaces a conventional spring (not shown) and C-shape ring (not shown) of a conventional rotor structure (not shown) while providing positioning and cushioning effects to rotor shaft 16.

Hooks 1221, 1222, 1223 extend upwardly from peripheral portion 121 towards the center such that the tips 1221a, 1221b, 1221c of hooks 1221, 1222, 1223 are disposed on a plane above peripheral portion 121. Alternatively, hooks 1221, 1222, 1223 may also extend downwardly from peripheral portion 121 towards the center such that tips 1221a, 1221b, 1221c of hooks 1221, 1222, 1223 are disposed on a plane below peripheral portion 121. Moreover, hooks 1221, 1222, 1223 may extend horizontally from peripheral portion 121 towards the center such that tips 1221a, 1221b, 1221c share a common plane with peripheral portion 121.

Accordingly, it will be seen that this invention provides for positioning and cushioning the rotor of a fan motor while eliminating the need for a spring and retaining clip, thereby facilitating assembly of a fan. Although the description above contains many specificities, these should not be construed as limiting the scope of the invention but as merely providing illustrations of some of the presently preferred embodiments of this invention. Thus the scope of this invention should be determined by the appended claims and their legal equivalents.

What is claimed is:

1. An apparatus for positioning and cushioning a rotor shaft of a fan motor, comprising:
   (a) a peripheral portion, said peripheral portion including an outer edge adapted to fit securely within a shaft tube of the fan motor;
   (b) a central portion for contacting one end of the rotor shaft;
   (c) a connecting portion, said connecting portion including a plurality of connecting pieces projecting radially from said central portion to said peripheral portion; and
   (d) a leg extending downwardly from each said connecting pieces to said peripheral portion.

2. An apparatus as recited in claim 1, wherein said central portion is disposed on a plane above said peripheral portion.

3. An apparatus for positioning and cushioning a rotor shaft of a fan motor, comprising:
   (a) a peripheral portion, said peripheral portion including an outer edge adapted to fit securely within a shaft tube of the fan motor, said outer edge of said peripheral portion comprises a plurality of teeth projecting radially outward;
   (b) a central portion for contacting one end of the rotor shaft, said central portion is disposed on a plane above said peripheral portion; and
   (c) a connecting portion, said connecting portion including a plurality of connecting pieces projecting radially from said central portion to said peripheral portion.

4. An apparatus as recited in claim 3, wherein said central portion is disposed on a plane above said peripheral portion.

5. An apparatus for positioning and cushioning a rotor shaft of a fan motor, comprising:

(a) a peripheral portion, said peripheral portion including an outer edge adapted to fit securely within a shaft tube of the fan motor;

(b) a generally cylindrical wall extending upwardly from said outer edge of said peripheral portion;

(c) a central portion for contacting one end of the rotor shaft; and (d) a connecting portion, said connecting portion including a plurality of connecting pieces projecting radially from said central portion to said peripheral portion.

6. An apparatus as recited in claim 5, wherein said central portion is disposed on a plane above said peripheral portion.

7. An apparatus for positioning and cushioning a rotor shaft of a fan motor, comprising:

(a) a peripheral portion, said peripheral portion including an outer edge adapted to fit securely within a shaft tube of the fan motor;

(b) a plurality of tabs extending upwardly from said outer edge of said peripheral portion;

(c) a central portion for contacting one end of the rotor shaft; and (d) a connecting portion, said connecting portion including a plurality of connecting pieces projecting radially from said central portion to said peripheral portion.

8. An apparatus as recited in claim 7, wherein said central portion is disposed on a plane above said peripheral portion.

9. An apparatus for positioning and cushioning a rotor shaft of a fan motor, comprising:

(a) a peripheral portion, said peripheral portion including an outer edge adapted to fit securely within a shaft tube of the fan motor;

(b) a plurality of posts extending upwardly from said outer edge of said peripheral portion;

(c) means for engaging an annular groove on the rotor shaft, said engaging means connected to said posts;

(d) a central portion for contacting one end of the rotor shaft; and (e) a connecting portion, said connecting portion including a plurality of connecting pieces projecting radially from said central portion to said peripheral portion.

10. An apparatus as recited in claim 9, wherein said engaging means comprises a hook extending radially inwards from each said post.

11. An apparatus as recited in claim 9, wherein said central portion is disposed on a plane between planes defined by said peripheral portion and said hooks.

12. An apparatus for positioning and cushioning a rotor shaft of a fan motor, comprising:

(a) a peripheral portion, said peripheral portion including an outer edge adapted to fit securely within a shaft tube of the fan motor;

(b) a plurality of legs extending below said outer edge of said peripheral portion;

(c) a generally circular base attached to said plurality of legs;

(d) a central portion for contacting one end of the rotor shaft; and (e) a connecting portion, said connecting portion including a plurality of connecting pieces projecting radially from said central portion to said peripheral portion.

13. An apparatus as recited in claim 12, wherein said central portion is disposed on a plane above said peripheral portion.

14. An apparatus for positioning and cushioning a rotor shaft of a fan motor, comprising:

(a) a peripheral portion, said peripheral portion including an outer edge adapted to fit securely within a shaft tube of the fan motor;

(b) a generally cylindrical base extending below said outer edge of said peripheral portion;

(c) a central portion for contacting one end of the rotor shaft; and (d) a connecting portion, said connecting portion including a plurality of connecting pieces projecting radially from said central portion to said peripheral portion.

15. An apparatus as recited in claim 14, wherein said central portion is disposed on a plane below said peripheral portion.

16. An apparatus for positioning and cushioning a rotor shaft of a fan motor, comprising:

(a) a peripheral portion, said peripheral portion including an outer edge adapted to fit securely within a shaft tube of the fan motor;

(b) a central portion for contacting one end of the rotor shaft;

(c) a connecting portion, said connecting portion including a plurality of connecting pieces projecting radially from said central portion to said peripheral portion; and (d) a support extending upwardly from each said connecting pieces to said peripheral portion.

17. An apparatus as recited in claim 16, wherein said central portion is disposed on a plane above said supports.

18. An apparatus for positioning and cushioning a rotor shaft of a fan motor, comprising:

(a) a peripheral portion, said peripheral portion including an outer edge adapted to fit securely within a shaft tube of the fan motor;

(b) a central portion for contacting one end of the rotor shaft;

(c) a connecting portion, said connecting portion including a plurality of connecting pieces projecting radially from said central portion to said peripheral portion; and (d) a leg extending downwardly from each said connecting pieces of said connecting portion, said leg(s) being attached to said peripheral portion and wherein said peripheral portion comprises a generally cylindrical wall.

19. An apparatus for positioning and cushioning a rotor shaft of a fan motor, comprising:

(a) a peripheral portion, said peripheral portion including an outer edge adapted to fit securely within a shaft tube of the fan motor, said outer edge of said peripheral portion comprises a plurality of teeth projecting radially outward;

(b) a central portion for contacting the rotor shaft, said central portion forming a recess for receiving one end of the rotor shaft, said central portion is disposed on a plane above said peripheral portion; and (c) a connecting portion, said connecting portion including a plurality of connecting pieces projecting radially from said central portion to said peripheral portion, whereby said central portion is suspended within said peripheral portion.

20. An apparatus as recited in claim 19, wherein said central portion is disposed on a plane above said peripheral portion.

21. An apparatus for positioning and cushioning a rotor shaft of a fan motor, comprising:

(a) a peripheral portion, said peripheral portion including an outer edge adapted to fit securely within a shaft tube of the fan motor;

(b) a generally cylindrical wall extending upwardly from said outer edge of said peripheral portion;

(c) a central portion for contacting the rotor shaft, said central portion forming a recess for receiving one end of the rotor shaft; and (d) a connecting portion, said connecting portion including a plurality of connecting pieces projecting radially from said central portion to said peripheral portion, whereby said central portion is suspended within said peripheral portion.

22. An apparatus as recited in claim 21, wherein said central portion is disposed on a plane above said peripheral portion.

23. An apparatus for positioning and cushioning a rotor shaft of a fan motor, comprising:

(a) a peripheral portion, said peripheral portion including an outer edge adapted to fit securely within a shaft tube of the fan motor;

(b) a plurality of tabs extending upwardly from said outer edge of said peripheral portion;

(c) a central portion for contacting the rotor shaft, said central portion forming a recess for receiving one end of the rotor shaft; and (d) a connecting portion, said connecting portion including a plurality of connecting pieces projecting radially from said central portion to said peripheral portion, whereby said central portion is suspended within said peripheral portion.

24. An apparatus as recited in claim 23, wherein said central portion is disposed on a plane above said peripheral portion.

25. An apparatus for positioning and cushioning a rotor shaft of a fan motor, comprising:

(a) a peripheral portion, said peripheral portion including an outer edge adapted to fit securely within a shaft tube of the fan motor;

(b) a plurality of posts extending upwardly from said outer edge of said peripheral portion;

(c) a hook extending radially inwards from each said post;

(d) a central portion for contacting the rotor shaft, said central portion forming a recess for receiving one end of the rotor shaft; and (e) a connecting portion, said connecting portion including a plurality of connecting pieces projecting radially from said central portion to said peripheral portion, whereby said central portion is suspended within said peripheral portion.

26. An apparatus as recited in claim 25, wherein said central portion is disposed on a plane between planes defined by said peripheral portion and said hooks.

27. An apparatus for positioning and cushioning a rotor shaft of a fan motor, comprising:

(a) a peripheral portion, said peripheral portion including an outer edge adapted to fit securely within a shaft tube of the fan motor;

(b) a plurality of legs extending below said outer edge of said peripheral portion;

(c) a generally circular base attached to said plurality of legs;

(d) a central portion for contacting the rotor shaft, said central portion forming a recess for receiving one end of the rotor shaft; and (e) a connecting portion, said connecting portion including a plurality of connecting pieces projecting radially from said central portion to said peripheral portion, whereby said central portion is suspended within said peripheral portion.

28. An apparatus as recited in claim 27, wherein said central portion is disposed on a plane above said peripheral portion.

29. An apparatus for positioning and cushioning a rotor shaft of a fan motor, comprising:

(a) a peripheral portion, said peripheral portion including an outer edge adapted to fit securely within a shaft tube of the fan motor;

(b) a generally cylindrical base extending below said outer edge of said peripheral portion;

(c) a central portion for contacting the rotor shaft, said central portion forming a recess for receiving one end of the rotor shaft; and (d) a connecting portion, said connecting portion including a plurality of connecting pieces projecting radially from said central portion to said peripheral portion, whereby said central portion is suspended within said peripheral portion.

30. An apparatus as recited in claim 29, wherein said central portion is disposed on a plane below said peripheral portion.

31. An apparatus for positioning and cushioning a rotor shaft of a fan motor, comprising:

(a) a peripheral portion, said peripheral portion including an outer edge adapted to fit securely within a shaft tube of the fan motor;

(b) a central portion for contacting the rotor shaft, said central portion forming a recess for receiving one end of the rotor shaft;

(c) a connecting portion, said connecting portion including a plurality of connecting pieces projecting radially from said central portion to said peripheral portion, whereby said central portion is suspended within said peripheral portion; and (d) a support extending upwardly from each said connecting pieces to said peripheral portion.

32. An apparatus as recited in claim 29, wherein said central portion is disposed on a plane above said supports.

33. An apparatus for positioning and cushioning a rotor shaft of a fan motor, comprising:

(a) a peripheral portion, said peripheral portion including an outer edge adapted to fit securely within a shaft tube of the fan motor;

(b) a central portion for contacting the rotor shaft, said central portion forming a recess for receiving one end of the rotor shaft;

(c) a connecting portion, said connecting portion including a plurality of connecting pieces projecting radially from said central portion to said peripheral portion, whereby said central portion is suspended within said peripheral portion; and (d) a leg extending downwardly from each said connecting pieces to said peripheral portion.

34. An apparatus as recited in claim 33, wherein said central portion is disposed on a plane above said peripheral portion.

35. An apparatus for positioning and cushioning a rotor shaft of a fan motor, comprising:

(a) a peripheral portion, said peripheral portion including an outer edge adapted to fit securely within a shaft tube of the fan motor;

(b) a central portion for contacting the rotor shaft, said central portion forming a recess for receiving one end of the rotor shaft;

(c) a connecting portion, said connecting portion including a plurality of connecting pieces projecting radially from said central portion to said peripheral portion, whereby said central portion is suspended within said peripheral portion; and (d) a leg extending downwardly from each said connecting pieces of said connecting portion, said leg(s) being attached to said peripheral portion and wherein said peripheral portion comprises a generally cylindrical wall.

36. An apparatus for positioning and cushioning a rotor shaft of a fan motor, comprising:

(a) a peripheral portion, said peripheral portion including an outer edge adapted to fit securely within a shaft tube of the fan motor, said outer edge of said peripheral portion comprises a plurality of teeth projecting radially outward;

(b) a central portion for contacting the rotor shaft, said central portion incorporating a hole for receiving one end of the rotor shaft therethrough, said central portion is disposed on a plane above said peripheral portion; and (c) a connecting portion, said connecting portion including a plurality of connecting pieces projecting radially from said central portion to said peripheral portion, whereby said central portion is suspended within said peripheral portion.

37. An apparatus for positioning and cushioning a rotor shaft of a fan motor, comprising:

(a) a peripheral portion, said peripheral portion including an outer edge adapted to fit securely within a shaft tube of the fan motor;

(b) a generally cylindrical wall extending upwardly from said outer edge;

(c) a central portion for contacting the rotor shaft, said central portion incorporating a hole for receiving one end of the rotor shaft therethrough; and (d) a connecting portion, said connecting portion including a plurality of connecting pieces projecting radially from said central portion to said peripheral portion, whereby said central portion is suspended within said peripheral portion.

38. An apparatus as recited in claim 37, wherein said central portion is disposed on a plane above said peripheral portion.

39. An apparatus for positioning and cushioning a rotor shaft of a fan motor, comprising:

(a) a peripheral portion, said peripheral portion including an outer edge adapted to fit securely within a shaft tube of the fan motor;

(b) a plurality of tabs extending upwardly from said outer edge of said peripheral portion;

(c) a central portion for contacting the rotor shaft, said central portion incorporating a hole for receiving one end of the rotor shaft therethrough; and (d) a connecting portion, said connecting portion including a plurality of connecting pieces projecting radially from said central portion to said peripheral portion, whereby said central portion is suspended within said peripheral portion.

40. An apparatus as recited in claim 39, wherein said central portion is disposed on a plane above said peripheral portion.

41. An apparatus for positioning and cushioning a rotor shaft of a fan motor, comprising:

(a) a peripheral portion, said peripheral portion including an outer edge adapted to fit securely within a shaft tube of the fan motor;

(b) a plurality of posts extending upwardly from said outer edge of said peripheral portion;

(c) a hook extending radially inwards from each said post;

(d) a central portion for contacting the rotor shaft, said central portion incorporating a hole for receiving one end of the rotor shaft therethrough; and (e) a connecting portion, said connecting portion including a plurality of connecting pieces projecting radially from said central portion to said peripheral portion, whereby said central portion is suspended within said peripheral portion.

42. An apparatus as recited in claim 41, wherein said central portion is disposed on a plane between planes defined by said peripheral portion and said hooks.

43. An apparatus for positioning and cushioning a rotor shaft of a fan motor, comprising:

(a) a peripheral portion, said peripheral portion including an outer edge adapted to fit securely within a shaft tube of the fan motor;

(b) a plurality of legs extending below said outer edge of said peripheral portion;

(c) a generally circular base attached to said plurality of legs;

(d) a central portion for contacting the rotor shaft, said central portion incorporating a hole for receiving one end of the rotor shaft therethrough; and (e) a connecting portion, said connecting portion including a plurality of connecting pieces projecting radially from said central portion to said peripheral portion, whereby said central portion is suspended within said peripheral portion.

44. An apparatus as recited in claim 43, wherein said central portion is disposed on a plane above said peripheral portion.

45. An apparatus as recited in claim 44, further comprising a generally cylindrical base extending below said outer edge of said peripheral portion.

46. An apparatus as recited in claim 45, wherein said central portion is disposed on a plane below said peripheral portion.

47. An apparatus for positioning and cushioning a rotor shaft of a fan motor, comprising:

(a) a peripheral portion, said peripheral portion including an outer edge adapted to fit securely within a shaft tube of the fan motor;

(b) a central portion for contacting the rotor shaft, said central portion incorporating a hole for receiving one end of the rotor shaft therethrough;

(c) a connecting portion, said connecting portion including a plurality of connecting pieces projecting radially from said central portion to said peripheral portion, whereby said central portion is suspended within said peripheral portion; and (d) a support extending upwardly from each said connecting pieces to said peripheral portion.

48. An apparatus as recited in claim 43, wherein said central portion is disposed on a plane above said supports.

49. An apparatus for positioning and cushioning a rotor shaft of a fan motor, comprising:
(a) a peripheral portion, said peripheral portion including an outer edge adapted to fit securely within a shaft tube of the fan motor;
(b) a central portion for contacting the rotor shaft, said central portion incorporating a hole for receiving one end of the rotor shaft therethrough;
(c) a connecting portion, said connecting portion including a plurality of connecting pieces projecting radially from said central portion to said peripheral portion, whereby said central portion is suspended within said peripheral portion; and
(d) a leg extending downwardly from each said connecting pieces to said peripheral portion.

50. An apparatus as recited in claim 49, wherein said central portion is disposed on a plane above said peripheral portion.

51. An apparatus as recited in claim 49, wherein said central portion is disposed on a plane below said legs.

* * * * *